United States Patent
Crockett et al.

(10) Patent No.: US 7,286,659 B2
(45) Date of Patent: *Oct. 23, 2007

(54) METHOD AND SYSTEM FOR TERMINATION BLOCKING OF MESSAGE DELIVERY SERVICE IN A SWITCH-BASED TELECOMMUNICATION SYSTEM

(75) Inventors: Susanne Marie Crockett, Buffalo Grove, IL (US); Gordon Lynn Blumenschein, Woodridge, IL (US)

(73) Assignee: AT&T Knowledge Ventures, L.P., Reno, NV (US)

( * ) Notice: Subject to any disclaimer, the term of this patent is extended or adjusted under 35 U.S.C. 154(b) by 43 days.

This patent is subject to a terminal disclaimer.

(21) Appl. No.: 10/423,822

(22) Filed: Apr. 24, 2003

(65) Prior Publication Data

US 2004/0037409 A1   Feb. 26, 2004

Related U.S. Application Data

(63) Continuation of application No. 09/312,910, filed on May 17, 1999, now Pat. No. 6,584,178, which is a continuation-in-part of application No. 09/239,232, filed on Jan. 28, 1999, now Pat. No. 6,424,702.

(51) Int. Cl.
    *H04M 3/42* (2006.01)
(52) U.S. Cl. ............... 379/210.02; 379/88.25; 379/221.14

(58) Field of Classification Search ............... 379/67.1, 379/88.17, 88.18, 88.11, 88.12, 88.19, 88.25, 379/207.02, 210.02, 210.03, 221.14
See application file for complete search history.

(56) References Cited

U.S. PATENT DOCUMENTS

| | | | | |
|---|---|---|---|---|
| 5,263,080 | A | * | 11/1993 | Jones et al. ............... 379/88.19 |
| 5,467,388 | A | * | 11/1995 | Redd et al. ............ 379/210.02 |
| 5,471,519 | A | * | 11/1995 | Howe et al. .............. 379/88.26 |
| 5,479,495 | A | * | 12/1995 | Blumhardt ............. 379/209.01 |
| 5,583,920 | A | * | 12/1996 | Wheeler, Jr. .............. 379/88.01 |
| 5,757,899 | A | * | 5/1998 | Boulware et al. ........... 379/196 |
| 5,768,358 | A | * | 6/1998 | Venier et al. .......... 379/221.14 |
| 5,812,640 | A | * | 9/1998 | Chawla et al. ........... 379/88.19 |
| 5,825,862 | A | * | 10/1998 | Voit et al. ............... 379/142.16 |
| 6,130,934 | A | * | 10/2000 | Meek et al. ........... 379/100.09 |
| 6,226,373 | B1 | * | 5/2001 | Zhu et al. ............... 379/207.02 |

* cited by examiner

*Primary Examiner*—Fan Tsang
*Assistant Examiner*—M. S. Alam Elahee
(74) *Attorney, Agent, or Firm*—Brinks Hofer Gilson & Lione

(57) ABSTRACT

A method for providing a messaging service in a telecommunication system (900) includes providing a calling party with an option to leave a voice message (1010). If the calling party accepts the option, determining screening criteria for the called communication station (1018). In response to the screening criteria, the call is selectively completed to a messaging service (172).

12 Claims, 12 Drawing Sheets

METHOD AND SYSTEM FOR TERMINATION BLOCKING OF MESSAGE DELIVERY SERVICE IN A SWITCH-BASED TELECOMMUNICATION SYSTEM

This is application is a continuation of U.S. application Ser. No. 09/312,910, filed May 17, 1999, now U.S. Pat. No. 6,584,178, which is a continuation-in-part application of application Ser. No. 09/239,232, filed Jan. 28, 1999, now U.S. Pat. No. 6,424,702, all of which are hereby incorporated by reference herein.

BACKGROUND

Convenience continues to be a predominant trend in today's society. With answering machines, voice mail and other messaging services becoming increasingly common, many callers find it frustrating to receive no answer. This situation arises when a caller attempts to reach a party that does not have an answering machine, voice mail or any other messaging service. Accordingly, there is a need for a message delivery service that enables a caller to benefit from the convenience of being able to leave a message even when the called party does not have a system automatically answering their phone. However, such a service should allow for called parties who insist on not receiving telephonic messages, to block the service, preventing messages from being delivered to their extension(s).

U.S. patent application Ser. No. 09/239,232, filed Jan. 29, 1999 and commonly assigned with the present application, is incorporated herein by reference. The incorporated application discloses an improved message delivery service that records a caller's message for subsequent delivery to a called party. The service includes, among other things, a blocking mechanism that can be configured at the request of the called party to prevent activation of the message delivery service. This feature is advantageous in that it provides subscribers the option of not receiving incoming calls from an automated message delivery system.

According to one embodiment of the incorporated application, an advanced intelligent network (AIN) is configured to provide a selectively-enableable messaging service for delivering caller information to a called party subsequent to an originating call. The messaging service is capable of collecting and recording the caller information during the originating call and then placing one or more calls to the called party at successive intervals to deliver the caller information. A blocking mechanism permits the called party to disable the messaging service so that it is not made available to the caller during the originating call.

Some communication systems include end office (EO) type switches in place of or in addition to AIN network elements. In such systems, the method and apparatus of the incorporated application cannot be properly implemented. In the AIN implementation, a query message is sent to a service control point (SCP) for terminating blocking status. This query occurs prior to the service being offered to the caller. When an end office type switch is present, there is no AIN trigger on the originating call. As a result, the system can not determine if the called telephone number has requested blocking of name and number delivery.

DETAILED DESCRIPTION OF PRESENTLY PREFERRED EMBODIMENTS

The present invention relates to an improved message delivery service that records a caller's message for subsequent delivery to a called party. The service includes, among other things, a blocking mechanism that can be configured at the request of the called party to prevent activation of the message delivery service. This feature is advantageous in that it provides subscribers the option of not receiving incoming calls from an automated message delivery system.

According to one embodiment of the present invention, an advanced intelligent network (AIN) is configured to provide a selectively-enableable message service for delivering caller information to a called party subsequent to an originating call. In the embodiment, an end office-type switch provides the service feature. The service is offered to the caller prior to determining the blocking status of the called number. Upon accepting the service, the caller is routed to a terminating service switching point (SSP) of the message platform. A query is generated to a service control point (SCP) which treats the query as a request for terminating blocking information for the name and number delivery service. If all criteria are satisfied, the caller is routed to a service node platform (SN/IP) for activation of the service.

A blocking mechanism permits the called party to disable the messaging service so that it is not made available to the caller during the originating call. The blocking mechanism can be included in any of the elements of the network, or alternatively, it can be provided as a separate device.

Figure 1:
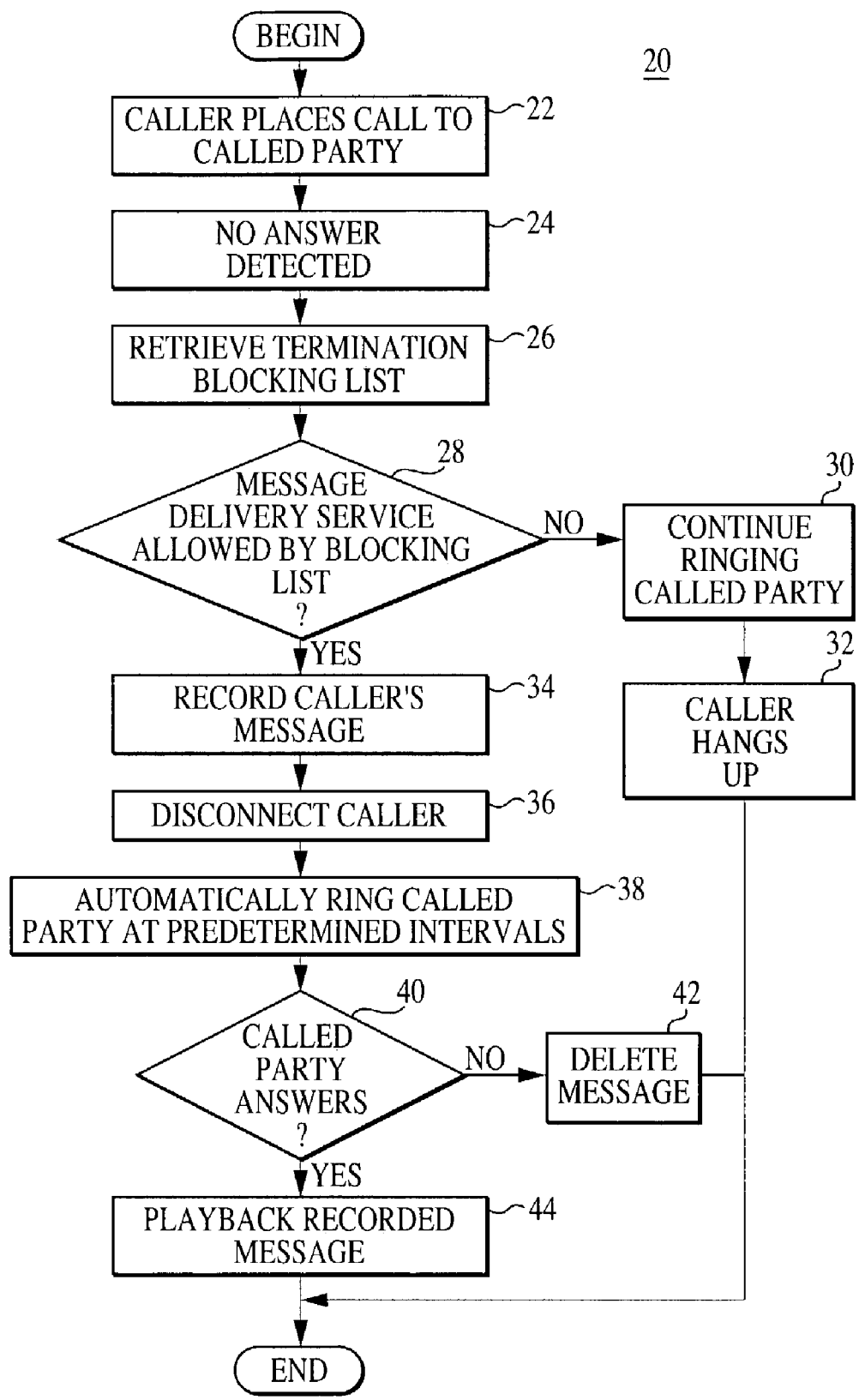
FIG. 1 shows a flowchart illustrating a method of operating a message delivery service in accordance with an embodiment of the present invention.

Turning now to the drawings, and in particular to FIG. 1, there is illustrated a flowchart diagram describing the operation of a message delivery service in a telecommunications system that accords with an embodiment of the present invention. In step 22, a caller places a call to the called party. Upon detecting a no-answer condition (step 24), a termination blocking list is accessed (step 26). A no-answer condition exists when a call has rung for a predetermined time without the called party answering. The termination blocking list can be a database file included in the blocking mechanism. The list can include caller-IDs, the names, numbers, or any other type of information for identifying called parties that do not wish to receive messages generated by the delivery service.

Accordingly, while the call is in progress, a check is made to determine whether or not the called party is included in the termination blocking list (step 28). If the called party is identified in the list, the message delivery service is blocked, i.e., it is not offered to the calling party. In this circumstance, the call simply continues ringing the called party, without the service being offered (step 30) until the caller hangs up (step 32) or the call is otherwise terminated. However, if the called party is not identified by the blocking list, the delivery service provides the caller the option of recording a message (step 34).

If the caller selects the service, a message is recorded and stored. After the message is recorded, the caller is disconnected (step 36). The service then automatically places one or more calls to the called party at predetermined intervals (step 38) to deliver the message. During each call, a check is made to determine whether the called party answers (step 40). If the party answers, the recorded message is played back (step 44). However, if after a predetermined number of attempts, the called party fails to answer the calls placed by the messaging service, the service deletes the stored message (step 42).

Figure 2:
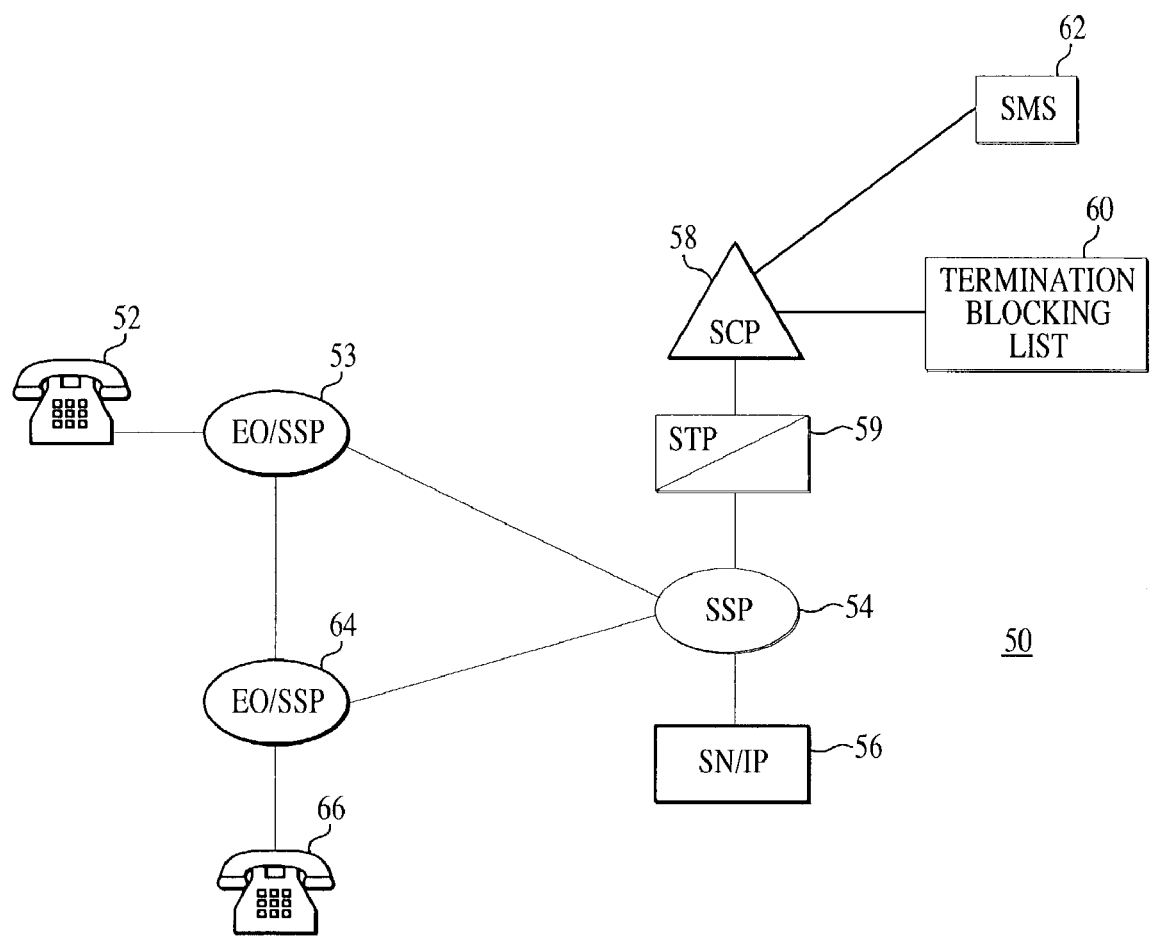
FIG. 2 is a block diagram illustrating a telecommunications system in accordance with an exemplary embodiment of the present invention.

Turning now to FIG. 2, there is illustrated a telecommunications system 50 providing an exemplary embodiment that accords with the present invention. The system 50 can include an advanced intelligent network (AIN) including an originating end office/service switching point (EO/SSP) 53, a SSP 54, a service control point (SCP) 58, a service node/intelligent peripheral (SN/IP) 56, a termination blocking list 60, a signal transfer point (STP) 59, a service management system (SMS) 62, and a termination EO/SSP 64. A caller customer premises equipment (CPE) 52, such as a telephone or the like, can communicate with the originating SSP 53, using any suitable interface, including a local loop, conventional analog, or alternatively, a digital communication link, such as an integrated service digital network (ISDN) interface. A called party CPE 66 such as a telephone or the like, communicates with the termination SSP 64 using a suitable interface, such as those listed above for the caller CPE 52.

The AIN architecture can be implemented with common channel Signaling System No. 7 (SS7) protocol. An SS7 network includes various packet switching elements and transmission links, some of which are shown in the system 50. For instance, the SMS 62 generally includes a computer-based system used to design service logic, to control logic implementation on the system 50, and to manage system operation, such as monitoring traffic levels, collecting statistics and billing data, and providing a mechanism for updating the AIN according to subscriber service orders. Although not so limited, the SMS 62 can be implemented by a computer workstation, such as an HP9000 from Hewlett-Packard, running commercially available SMS software.

The SCP 58 can be a commercially-available AIN node which contains the service logic and associated data support to execute the required customer services. For example, the SCP 58 can be implemented using an SCP Model 1 or Model 2, available from Lucent Technologies, Inc.

As is known in the art, the STP 59 can be a packet switch used to route signaling messages within the network.

The EO/SSP 53, 64 and the SSP 54 can be commercially-available AIN nodes used as local or central office switches sometimes also referred to as an end-office, which recognize "triggers" generated when a call invokes an AIN service. As is known in the art, standard triggers are provided with commercially-available SSPs, as well as proprietary triggers that are available with and well documented for specific SSPs. Generally, upon detecting a trigger, an SSP communicates with its SCP to operate the invoked service.

The functionality of the originating and termination EO/SSPs 53, 64 as disclosed herein can be implemented using a 5ESS switch, with generic 5E11 update or better, available from Lucent Technologies, Inc.

The termination blocking list 60 can be a database file containing information (such as a party's name and number), for identifying parties that do not want the messaging service to deliver information to them. If a party has entered into the termination blocking list 60, the messaging service will be blocked, and the caller will not be given the option to invoke the service. The termination blocking list 60 can be updated to include or delete a party's entry therein. This can be accomplished by the party submitting a service order to the SMS 62, which in turn, sends a message to the SCP 58 causing a service logic thereof to modify the termination blocking list. The SMS 62 can include a standard software interface configured to permit an operator to manually enter a service request generated by a party to create a service order.

The SN/IP 56 can be a computer or communication server linked via an open interface to the originating SSP 54. In the example shown, the SSP 54 and the SN/IP 56 communicate via an integrated services digital network (ISDN) connection. The ISDN link can be implemented using either ISDN-BRI (basic rate interface) or ISDN-PRI (primary rate interface) protocols, which are known in the art.

It is not necessary to have SN/IP 56 directly connected to the originating SSP 54. The SN/IP 56 can be alternatively connected to another SSP or an end office (EO) (not shown) that is in communication with the originating SSP 54. In this arrangement, calls are connected to the SN/IP by routing them through the other SSP or EO hosting the SN/IP.

The SN/IP 56 contains and manages resources required to offer services and service enhancements to network users. Generally, the SN/IP 56 may be used to combine advanced speech technologies and computer telephony integration (CTI) capabilities in a single platform that can be used as a network resource. The services provided by the SN/IP 24 can include voice or fax store and forward, dual-tone multi-frequency (DTMF) recognition with external telephony resources, text-to-speech synthesis, and the like. A compact service node (CSN) as manufactured by Lucent Technologies, Inc., can be used to provide the functionalities of the SN/IP 56 disclosed herein.

Figure 3:
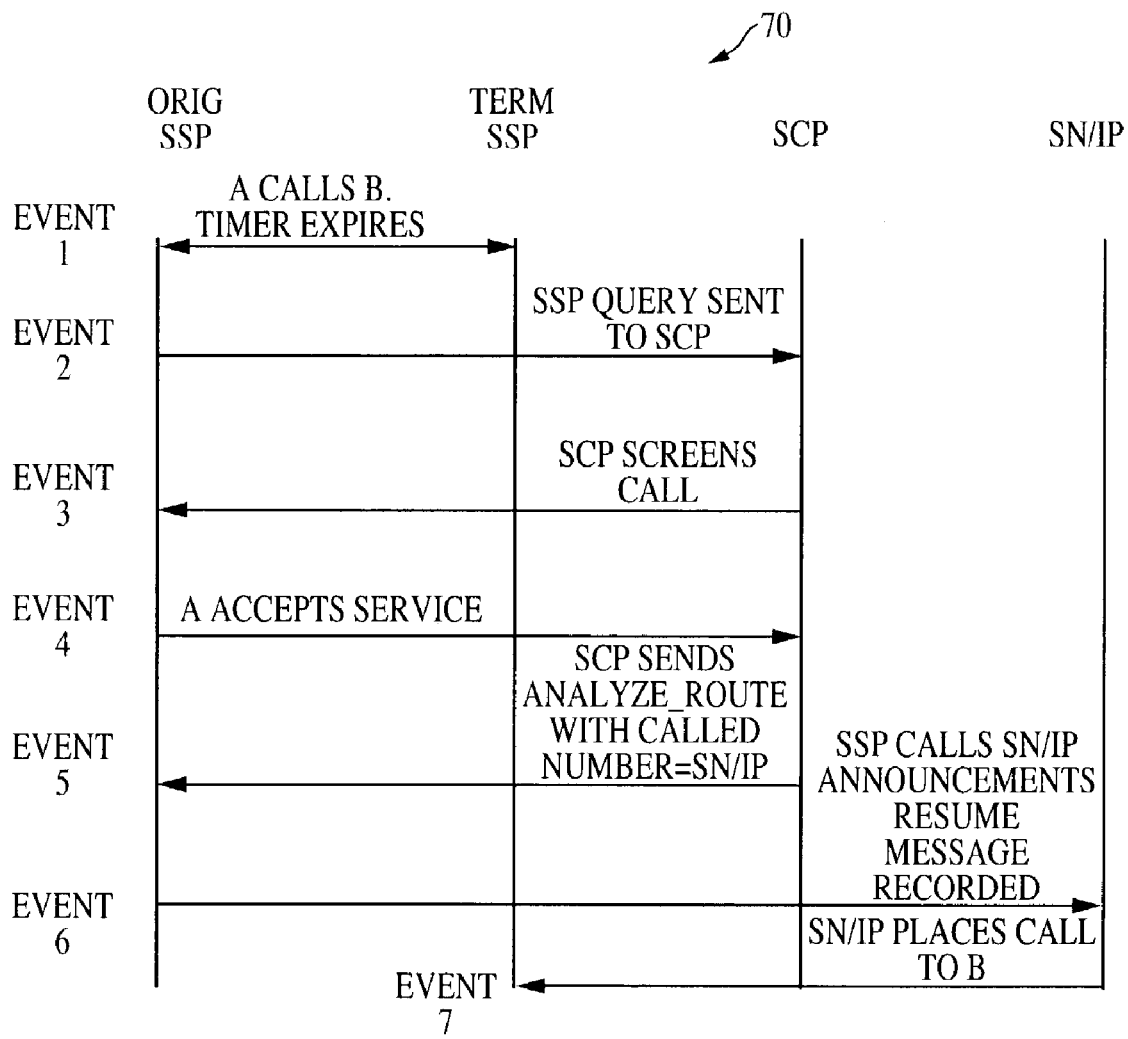
FIG. 3 shows an event diagram depicting caller invocation of the message delivery service available from the system of FIG. 2.

FIG. 3 shows an event diagram 70 depicting the invocation of the message delivery service in the AIN of FIG. 2. Initially, the calling party (party A) calls the called party (party B) (Event 1). The call is placed from the caller unit 52, and received by the originating SSP 54, which routes the call to the termination SSP 64. After connecting the call, a no-answer office trigger is generated by the originating SSP 54 upon party B's failure to answer after a predetermined, programmable interval has elapsed. The originating SSP 54 includes a timer (not shown) for determining elapsed time. Upon detecting the no-answer trigger, the originating SSP 54 queries the SCP 58. The query can be sent to the SCP 58 using a conventional SS7 protocol. In response to the query, the SCP 58 screens the call to determine whether the message delivery service is available to party A. The screening is accomplished by comparing caller information and/or called party information to predetermined criteria, such as lists of restricted prefixes, non-LATA callers, and the like. The caller/called party information can be provided with the query message. If the service is available, the SCP 58 notifies the SSP 54, causing the SSP 54 to generate an announcement to party A offering the message delivery service.

Party A's response to this offer is passed from the SSP 54 to the SCP 58, which then determines whether or not party A has selected to deliver a message. If party A has selected the service, the SCP 58 sends an analyze-route message to the SSP 54, where the analyze route message includes a called number parameter sent to the number of the SN/IP 56. Upon receiving the analyze-route message, the SSP 54 connects the call SN/IP 56, which can play a series of announcements to party A and collect and record caller information. The caller information can include the caller's name and phone number. After the call has terminated, the SN/IP 56 places successive calls to party B via the termination SSP 64 until the party B answers or a predetermined maximum number of attempts is exceeded. If party B answers any of these calls, the recorded message is delivered by playing it back to party B.

Figure 4:
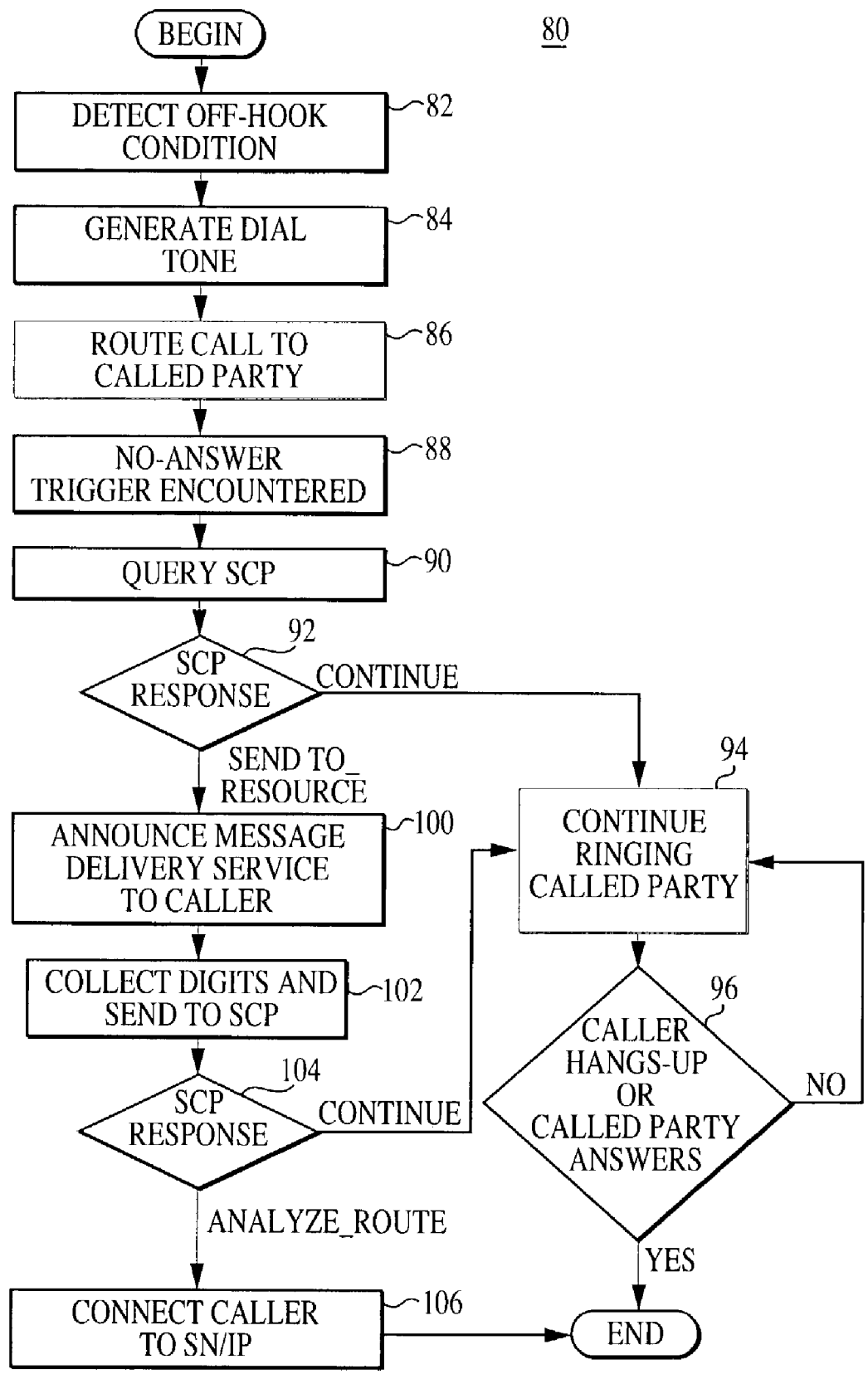
FIG. 4 shows a flowchart diagram illustrating the operation of the originating service switching point (SSP) of FIG. 2 in accordance with an embodiment of the invention.

FIG. 4 shows a flowchart diagram of a method 80 of operating the originating SSP 54 shown in FIG. 2. In step 82, the SSP 54 detects an off-hook condition generated by the caller CPE 52. In response to the off-hook condition, the SSP 54 provides a dial tone (step 84) to the caller CPE 52. After receiving a dialed number, the SSP 54 routes the call to the called parties premise equipment 66 (step 86). After the call has been allowed to ring for a predetermined time without answer, a no-answer trigger is encountered by the SSP 54 (step 88). In response to the no-answer trigger, the SSP 54 transmits a no-answer query to the SCP 58 (step 90). The no-answer query can include caller and called party's information. The SCP 58 then screens the call according to predetermined criteria and then provides a response to the SSP 54. Details of the screening criteria are provided below with reference to FIGS. 5-7. Referring back to FIG. 4, in step 92, the SSP 54 receives the SCP response. If the SCP 58 responds with a continue message, the messaging service is not invoked and the SSP 54 continues ringing the called party (step 94) until the caller hangs up or the called party answers (step 96).

However, if the SCP 58 transmits a send-to-resource message to the SSP 54, the messaging service will be offered to the called party. In this case, the SSP 54 plays an announcement to the caller giving the caller the option to select the messaging service (step 100). In step 102, the SSP 54 collects the digits entered by the caller in response to the announcement and sends them to the SCP 58 to be analyzed. The SCP 58 compares the caller digits to predetermined criteria to determine whether the caller has selected the service. If the caller selects the service, the SCP transmits an analyze-route message to the SSP 54; otherwise, if the caller has not selected the service, the SCP 58 transmits a continue message (step 104). If the SSP 54 receives the continue message, the service is not offered and the SSP 54 continues to ring the called party (step 94) until the caller hangs up or the called party answers (step 96). However, upon receiving an analyze-route message, the SSP 54 attempts to connect the caller to SN/IP 56 (step 106).

Figure 5:
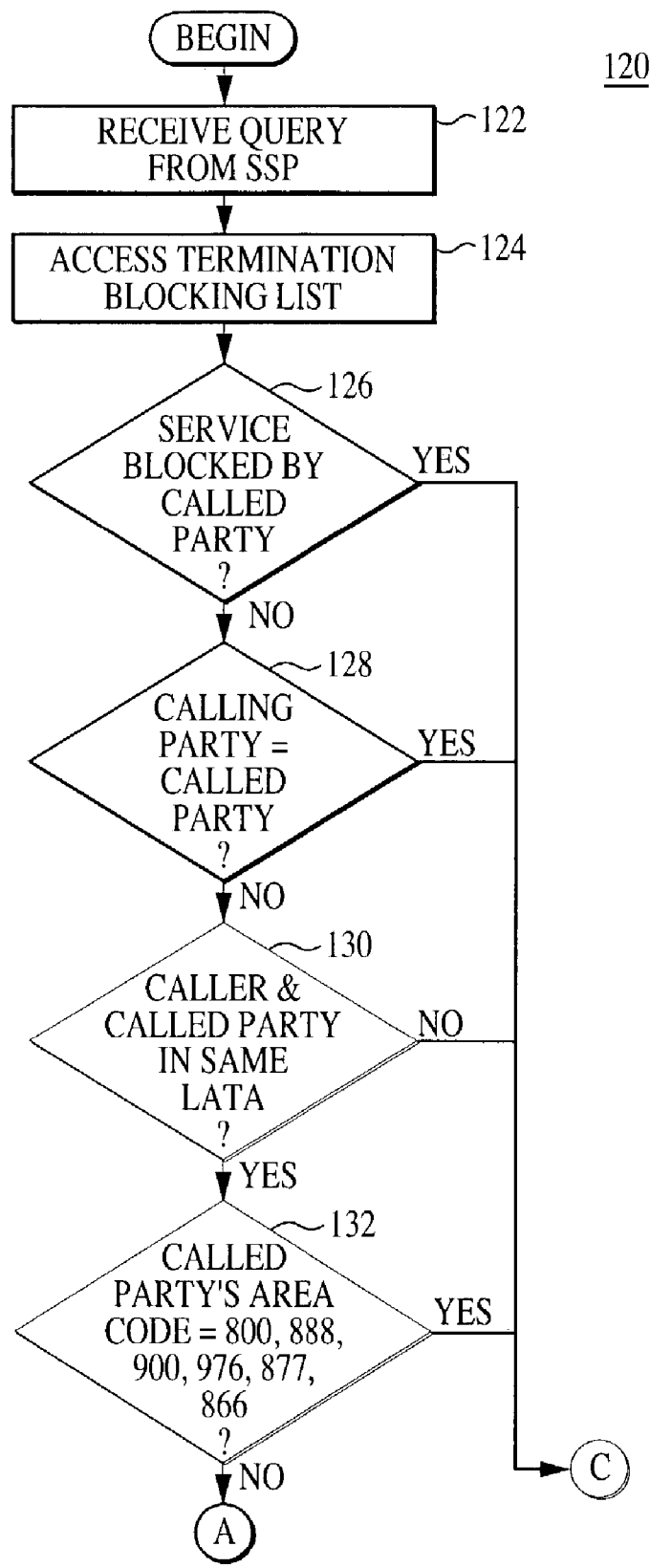
FIGS. 5-7 show a flowchart diagram illustrating a method of operating the originating service control point (SCP) of FIG. 2 in accordance with an embodiment of the present invention.
Figure 6:
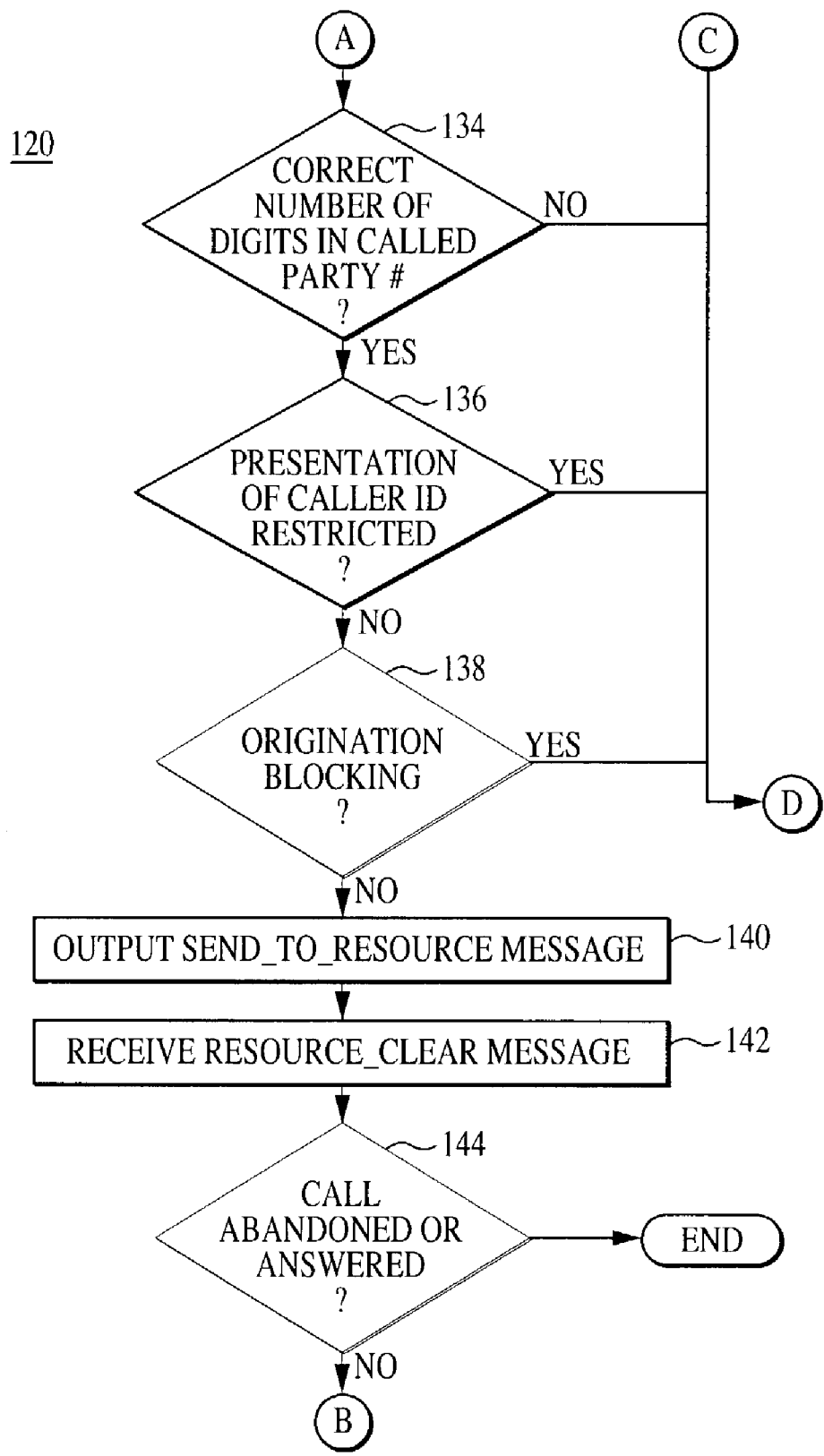
Figure 7:
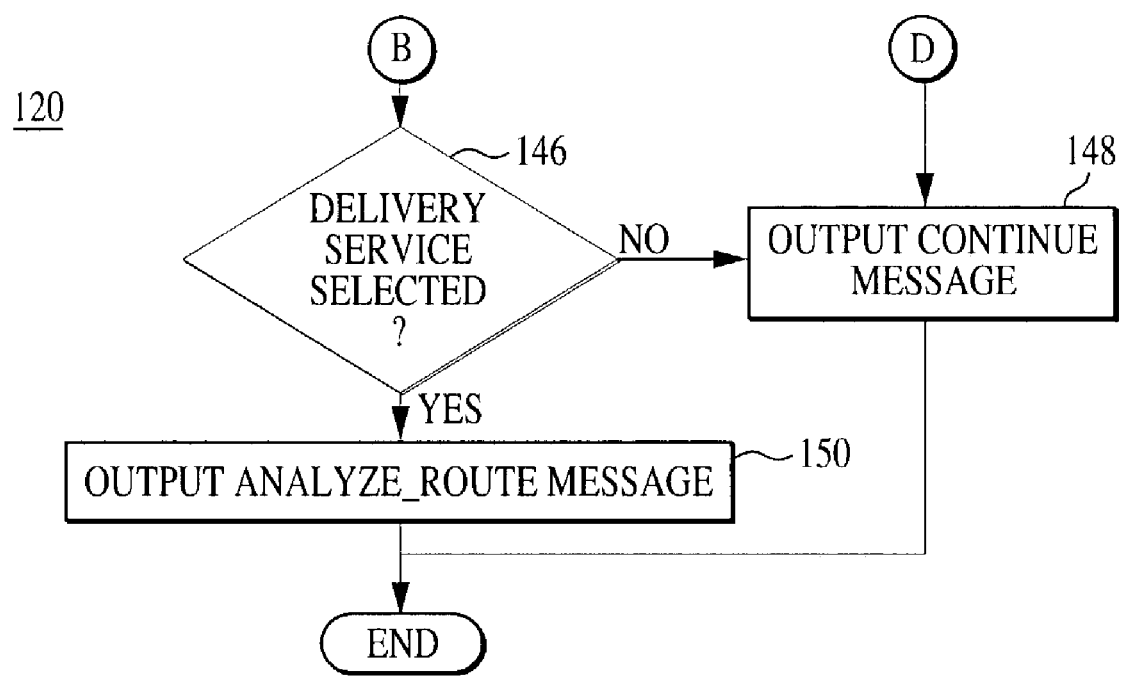

FIGS. 5-7 show a flowchart illustrating a method 120 of operating the originating SCP 58 shown in FIG. 2. The primary functions of the SCP 58 are to control the service and to screen the calls by comparing incoming caller/called party information to the predetermined criteria. To provide the message delivery service, the SCP 58 communicates with the SSP 54 and provides control information for successfully routing the originating call. To provide the message delivery service, operation of the SCP 58 commences upon receiving a no-answer query from the SSP 54 (step 122). Upon receiving this query, the SCP 58 accesses the termination blocking list 60 (step 124). As described above, the termination blocking list 60 can be a database file containing information for identifying parties that do not want the messaging service to deliver caller information to them.

After accessing the termination blocking list 60, the SCP 58 determines whether the message delivery service has been blocked by the called party (step 126). If so, the SCP 58 outputs a continue message to the SSP 54, causing the SSP 54 to continue ringing the called party without offering the service. However, if the service is not blocked by the termination blocking list, the method 120 proceeds to step 128.

The remaining screening criteria discussed in reference to steps 128-138 are not exhaustive, representing examples of possible criteria that can be used in conjunction with the termination blocking list 60. In step 128, a check is made to determine whether the identity of the calling party is equal to that of the called party. If so, the SCP 58 generates the continue message step 148 and the service is not offered. Otherwise, the SCP 58 continues its screening process by comparing the call to additional criteria. In step 130, a check is made to determine whether the caller and the called party reside within the same local access and transport area (LATA). If not, the SCP 58 outputs a continue message to the SSP 54. Otherwise, the method proceeds to step 132, where the area code of the called party is checked to determine whether it is restricted from using the messaging service. A list of excluded area codes can include toll-free numbers, such as 800 and 888 numbers, as well as toll numbers, such as 900 and 976 area codes. The SCP 58 can be configured to prohibit the message delivery service from any predetermined area code.

Next, in step 134 a check is made to determine whether or not the called party phone number includes the correct number of digits. For example, the correct number of digits in a phone number is typically ten or seven. If the correct number of digits is not present, the SCP 58 generates a continue message and the service is not offered (step 148). Otherwise, the SCP 58 continues its comparisons and determines whether the called party's caller-ID has been blocked, restricting presentation thereof (step 136). If so, the message delivery service is not offered and the SCP 58 generates a continue message (step 148). Next, in step 138 the SCP 58 checks an origination blocking list to determine whether or not the caller is prohibited from accessing the message delivery service. The origination blocking list can have a function analogous to that of the termination blocking list, in that it prevents the message delivery service from being offered to predetermined callers. However, the two blocking lists differ in that the origination blocking list contains entries identifying calling parties, while the termination blocking list contains entries identifying called parties. Accordingly, if the caller is identified in the origination blocking list, the SCP 58 generates a continue message (step 148) and the caller is denied access to the delivery service.

If the call satisfies all of the predetermined criteria utilized by the SCP 58, the SCP 58 outputs a send-to-resource message to the SSP 54 (step 140). This message causes the SSP 54 to present the messaging service announcement to the caller. The SCP 58 then waits until it receives a resource-clear message containing the caller's response (step 142). In step 144, a check is made to determine whether the resource-clear message indicates that the call was answered or abandoned. If so, the SCP 58 terminates its actions regarding the message delivery service. If not, a check is made by the SCP 58 to determine whether the caller has selected the message delivering service (step 146). If not, the SCP 58 outputs the continue message (step 148). If so, the SCP 58 outputs an analyze-route message, causing the SSP 54 to connect the call to the SN/IP 56 (step 150).

Figure 8:
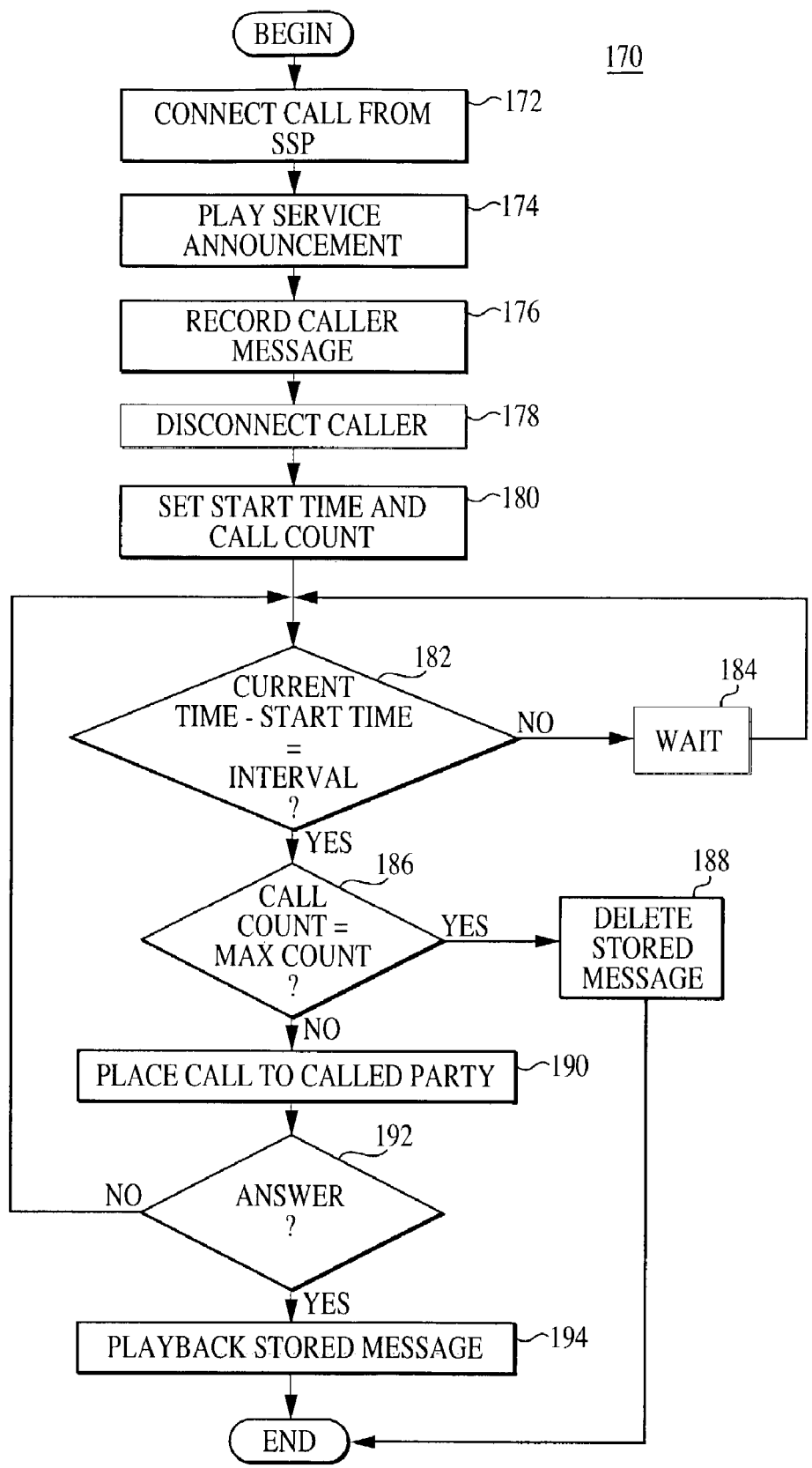
FIG. 8 shows a flowchart diagram illustrating a method of operating the service node/intelligent peripheral (SN/IP) of FIG. 2 in accordance with an embodiment of the present invention.

FIG. 8 depicts a flowchart illustrating a method 170 of operating the SN/IP 56 to provide the message delivery service. Under the delivery service, the SN/IP 56 commences operation when the SSP 54 connects the call thereto (step 172). After receiving a call from the SSP 54, the SN/IP 56 plays an audible service announcement describing the message delivery service and providing a number of options to the caller, such as message playback, editing, or deletion.

In step 176, the SN/IP 56 records and stores the caller's message. The message can include the caller's name and number as spoken by the caller. Alternatively, the recorded message can include caller-ID information automatically provided to the SN/IP 56 by the SSP 54. This information can be provided to a text-to-speech synthesizer (not shown) within the SN/IP 56 for audible delivery to the called party at a later time. After the message is recorded, the caller is disconnected from the AIN (step 178). After the caller has been disconnected, the SN/IP 56 can set software variables representing a start time and a call count. These variables are used to determine the interval between calls placed by the SN/IP 56 to the called party and the number of attempts by the SN/IP 56 to reach the called party. In step 182, a check is made to determine whether the difference between the current time and the start time is equal to a predetermined interval defining the period between successive calls made by the SN/IP 56 to the called party. The current time can be provided by a conventional system clock provided within the SN/IP 56. If the interval has not elapsed, the message delivery service enters a temporary wait state (step 184) and then repeats the check of whether the interval has elapsed. After the interval has elapsed, the call count is compared to a predetermined maximum call count. The maximum call count can be a programmable software variable indicating the maximum number of attempts by the SN/IP 56 to successfully complete a call to the called party. In the example shown, if the call count is equal to the maximum count, the SN/IP 56 has failed to deliver the stored message and, in turn, deletes the message (step 188). However, if the call count has not exceeded the maximum count, the SN/IP 56 places the message delivery call to the called party (step 190). The SN/IP 56 monitors the call to determine whether or not called party answers (step 192). If the party answers, the stored message is played back to the called party. The SN/IP 56 can be configured to provide playback options to the called party, such as playback repeat, message forwarding, message archiving, or the like. However, if the called party does not answer, the call count variable is incremented and a new successive interval is commenced and the method 170 returns to step 182.

The AIN elements, such as the SSP 54, the SCP 58, and the SN/IP 56, can be configured to accept an article of manufacture, such as a computer-readable medium that contains software components in accordance with an embodiment of the present invention. In sum, there has been disclosed herein a system and method that permits a telephonic message delivery service to be blocked by a called party. Because the system and method as disclosed herein can utilize a termination blocking list, it can permit a party to conveniently and transparently disable the service.

Figure 9:
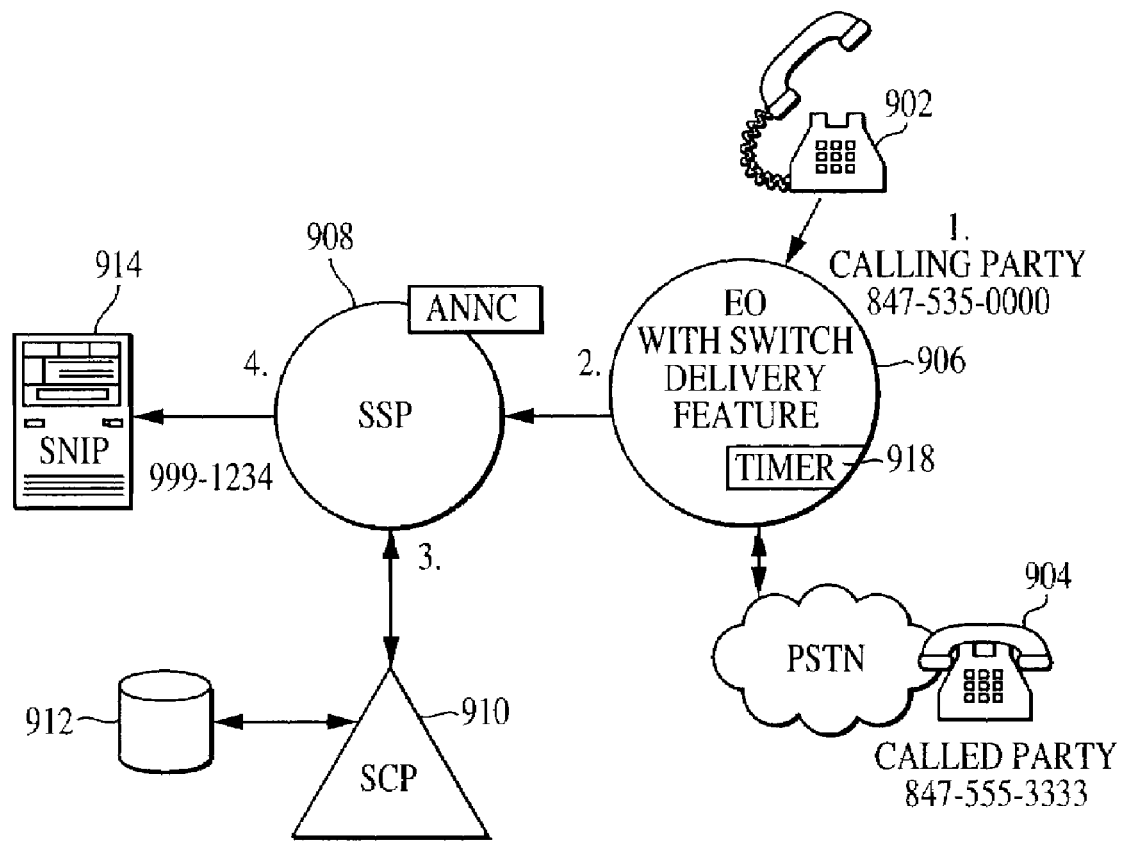
FIG. 9 is a block diagram illustrating a second exemplary embodiment of the present system.

Referring now to FIG. 9, it shows a block diagram illustrating a second exemplary embodiment of the present system. FIG. 9 illustrates a telecommunication system 900 for providing a messaging service to a calling party at a calling communication station 902 for a called party at a called communication station 904. The embodiment illustrated in FIG. 9 is suitable for switch based delivery of name and number information in a messaging service.

The telecommunication system 900 includes an end office switch 906, a service switching point (SSP) 908, a service control point (SCP) 910, a data base 912 and a network element 914. The end office switch 906 is coupled with the calling communication station 902. The end office switch 906 is configured to provide an announcement offering the messaging service to the calling communication station 902. The end office switch 906 may be any suitable switch as known to those skilled in the art. One example of a suitable switch is a DMS end office switch manufactured by Northern Telecom Ltd. As indicated in FIG. 9, the end office switch is configured with a message delivery feature, for example by software programming of the end office switch 906. Further, the end office switch 906 includes a timer 918.

The SSP 908 is coupled with the end office switch 906 and configured to receive a call forwarded from the end office switch 906 in response to selection of the messaging service by the calling party at the calling communication station 902. Further, the SSP 908 is configured to generate a query message in response to the call from the end office switch 906. The SSP 908 may be any suitable AIN element as known to those ordinarily skilled in the art. The SCP 910 is coupled with the SSP 908 and configured to test parameters associated with the call against predetermined screening criteria. The SCP 910 passes a message having a first message type to the SSP when the screening criteria are passed. The SCP 910 operates in conjunction with the database 912 by storing and retrieving data on the database 912. In the context of the illustrated embodiment, the database 912 stores a termination blocking list for reference by the SCP 910.

The network element 914 is coupled with the SSP 908 and configured to control recording of a message by the calling party for subsequent playback to the called party. The network element may be any suitable AIN element such as a service node (SN), AIN intelligent peripheral (IP) or compact service node (CSN). For convenience, the network element 914 will be subsequently referred to herein as SNIP 914. However, it is to be recognized that any suitable element may be substituted in the telecommunication system 900. Operating in response to instructions and data stored at the SNIP 914, the SNIP 914 provides messages and announcements to both the calling party at the calling communication station 902 and the called party at the called communication station 904, as well as recording a message from the calling party for replay to the called party.

Figure 10:
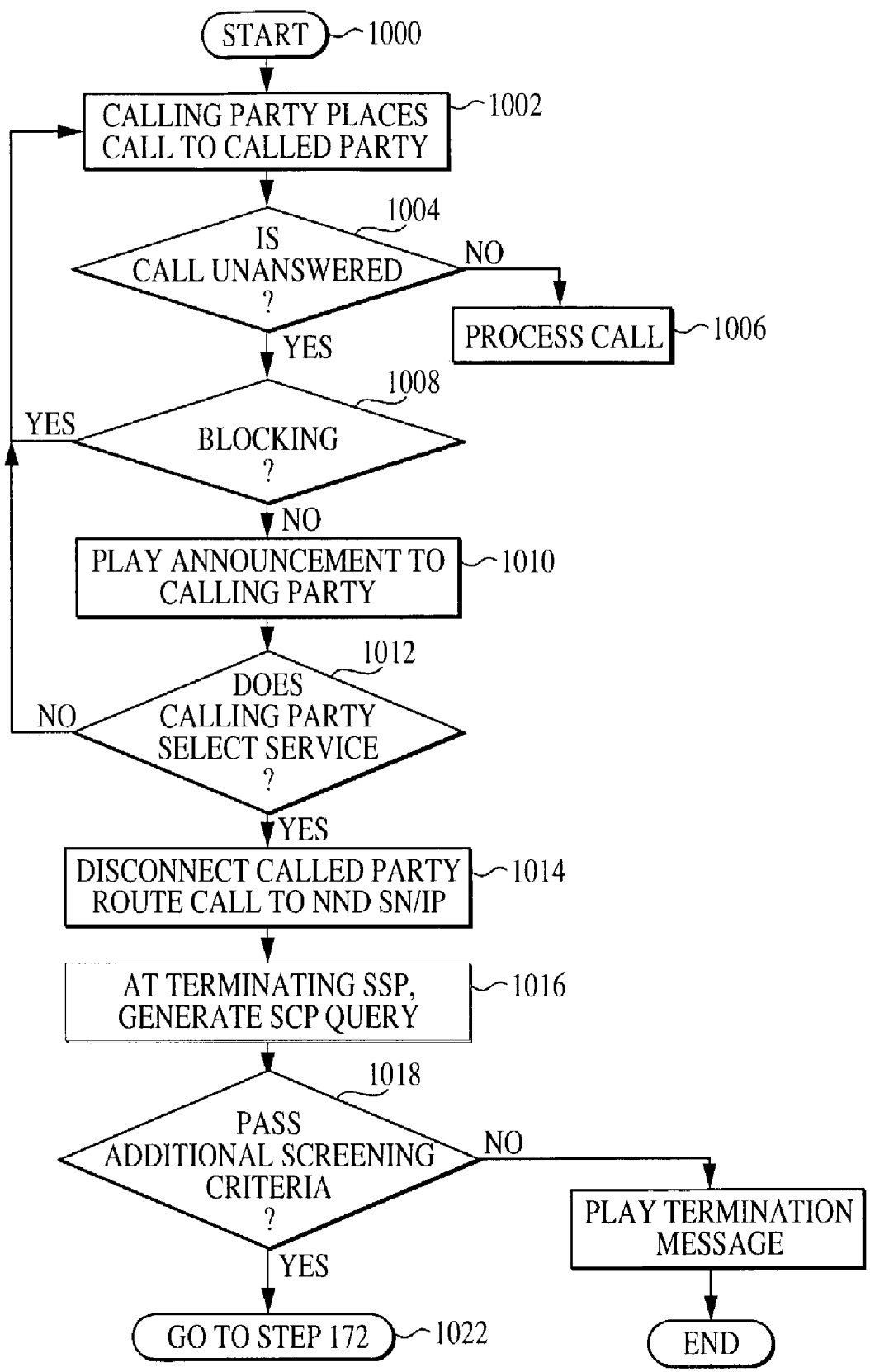
FIGS. 10-12 are a flow diagram illustrating a method of operating the system of FIG. 9.
Figure 11:
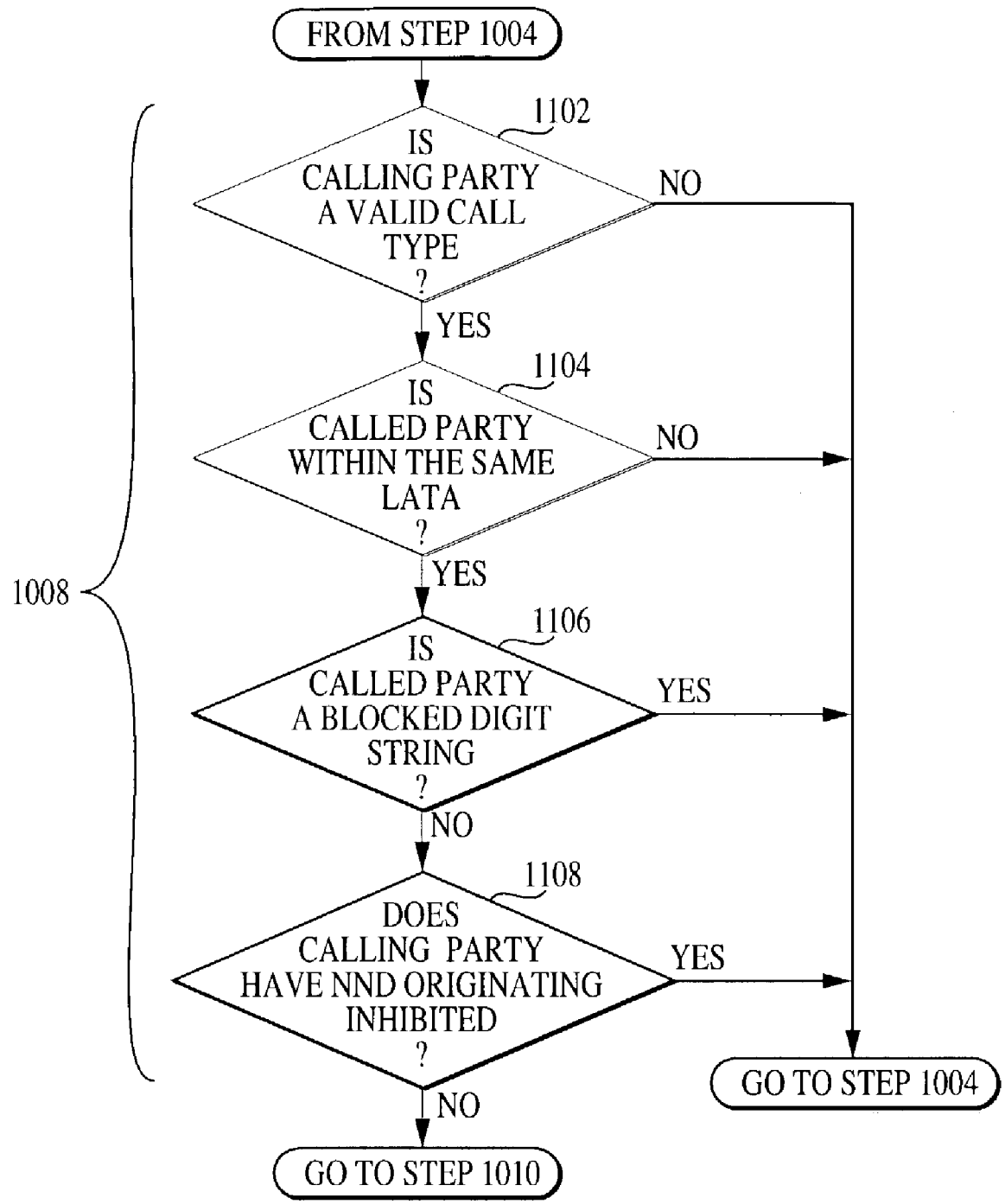
Figure 12:
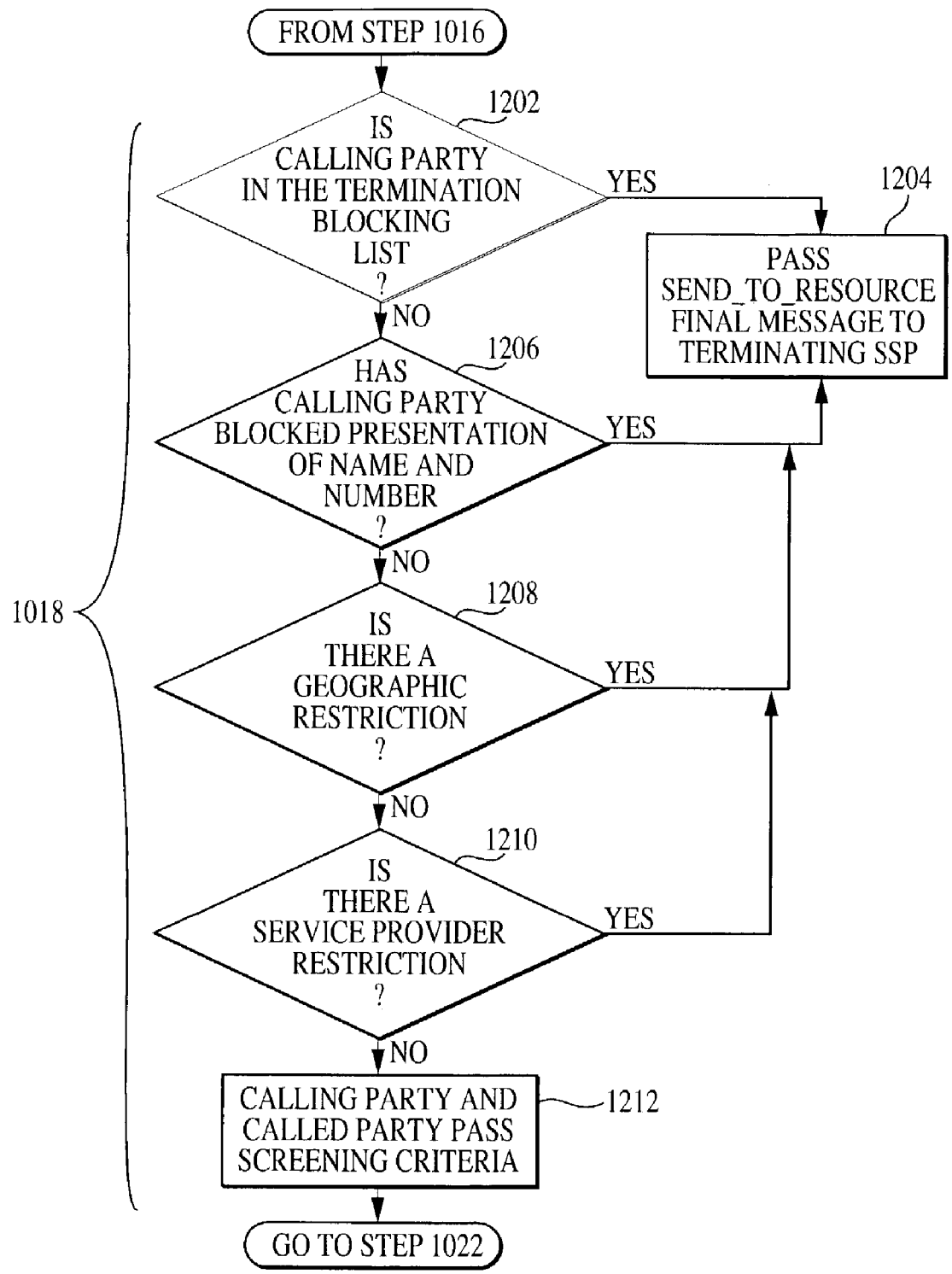

FIGS. 10, 11 and 12 illustrate a method of operating the telecommunication system 900 of FIG. 9 to control a messaging system and provide switch based termination blocking of the messaging system. The method begins in FIG. 10 at step 1000. At step 1002, the calling party at the calling communication station goes off hook and dials the called party at the called communication station. When the calling communication station begins ringing, the end office switch starts a timer to time the ringing duration. In one application the timer is referred to as an access to messaging timer. This timer expires after a predetermined ringing duration, such as 28 seconds. By using the timer, the end office switch determines if the call is answered at the called communication station, step 1004. If the call is answered, at step 1006, the call is processed normally. If the call is not answered, at step 1008, the end office switch determines a blocking status for the call.

Step 1008 is illustrated in further detail in FIG. 11. Before offering the message delivery service to the calling party, the end office switch determines if any blocking has been established to cause the feature to be ignored. If the feature is ignored, ringing will continue and no interruption of the call will be made. To determine the blocking status, at step 1102, the end office switch first determines the calling party is a valid call type. If not, the blocking status for the call is blocked. Control then returns to step 1004 (FIG. 10) and the call continues ringing. If the calling party is a valid call type, at step 1104, the end office switch determines if the called party is within the same local access and transport area (LATA). If the calling party and the called party are not in a common LATA, the messaging service will be blocked and control returns to step 1004. If the two called communication stations are within the same LATA, at step 1106, the end office switch determines if the directory number for the called communication station is a blocked digit string. If so, control returns to step 1004 and the messaging service will not be provided to the calling party. If the called party is not a blocked digit string, at step 1108, the end office switch determines if the calling party has name and number delivery (NND) origination inhibited. This may be an option selected by the calling party at the calling communication station. If NND origination is inhibited, control returns to step 1004 and the message delivery service is not offered. If all of the tests illustrated in FIG. 11 are satisfied, the end office switch determines that the blocking status for the call is unblocked. In alternative embodiments, fewer or none of the tests illustrated in FIG. 11 may be performed. Similarly, other tests not illustrated in FIG. 11, but suitable for determining the blocking status of the call, may also be performed.

Referring again to FIG. 10, after determining the unblocked status of the call, the end office switch plays an announcement to the calling party at step 1010. The announcement is an audible message providing the calling party with an option to leave a voice message for subsequent delivery to the called party. Ringing continues at the called communication station while the initial name and number delivery service announcement is offered to the calling party. The calling party may select the service, step 1012, in any suitable manner. In one embodiment, the calling party presses a key on the keypad of the calling communication station. This keypress is detected at the end office switch. The called communication station is then disconnected from the call. The call is then routed to the directory number for the SNIP 914 which provides the name and number delivery service. In response to the calling party's selection, the call is routed by the end office switch to the SSP using the directory number for the SNIP 914. At the SSP, the directory number for the SNIP is assigned a specific digit string (3/6/10) trigger. Upon encountering this SDS trigger, the SSP sends a query message to the SCP for further routing instructions. In the illustrated embodiment, the query message is an Info_Analyzed query message, step 1016. At step 1018, the SCP determines if the call passes additional screening criteria.

Step 1018 is illustrated in further detail in FIG. 12. In the method steps of FIG. 12, the SCP determines additional screening criteria, including called party number termination blocking and calling party presentation restrictions. At step 1202, the SCP determines if the original Called Party identifier is entered into the termination blocking list, which is stored in the database associated with the SCP. If the called party identifier, which may be the directory number for the communication station, is stored in the termination blocking list, the SCP passes a Send_To_Resource final message to the terminating SSP, step 1204. If the called party is not in the terminating blocking list, at step 1206, the SCP determines if the calling party has blocked presentation of name and number information. This may be done, for example, by pressing *67 before dialing the directory number of the called party. If the calling party has blocked the presentation of the directory number, the SCP must not allow the call to continue to the SNIP platform. Accordingly, the SCP passes the Send_To_Resource final message to the terminating SSP, step 1204.

If the calling party has not blocked presentation of name and number information, at step 1208, the SCP determines if there is any geographic restriction on further processing of the call. Because of network features available in certain areas, further processing of calls originating in these areas may not be available. If so, control proceeds to step 1204. Further, at step 1210, the SCP determines if there is a service provider restriction. For example, if the original called party identifier indicated that the calling communication station is a cellular telephone or is associated with a competitive local exchange carrier (CLEC) the SCP passes a Send_To_Resource final message to the terminating SSP, step 1204. A CLEC is a network controlled by a different entity other than the telecommunications entity controlling the current telecommunications system. If all of the tests illustrated in FIG. 12 are passed, at step 1212, the calling party and the called party pass the screening criteria. Control returns to FIG. 10, step 1022. At step 1022, control is then passed to step 172, FIG. 8. In response to passing the criteria, the SCP passes an Analyze_Route response message. In response to this message, the SSP connects the calling communications station to the network element, such as a SNIP, which provides the messaging service. The terminating SSP places a set up message to the primary rate interface (PRI). The SNIP sees the incoming call to the directory number for the called communication system as a request for the message delivery service. Processing then continues as is illustrated in FIG. 8.

From the foregoing, it can be seen that the present system and method permit operation of a message delivery service in a telecommunication system. In particular, the service is available even when the calling communication station is served by an end office switch. If any of the tests illustrated in FIG. 12 are not passed, control returns to step 1020, FIG. 10. A termination message is played to the calling party and the call is terminated.

While a particular embodiment of the present invention has been shown and described, modifications may be made. It is therefore intended in the appended claims to cover all such changes and modifications which follow in the true and spirit of the invention.

We claim:

1. A telecommunications system for processing a call from a calling communication station for a called communication station, the telecommunications system comprising:

a non-Advanced Intelligent Network (AIN) capable end office switch configured to ring the called communication station with the call, the call having no AIN trigger present, and determine blocking status for the call, the end office switch being further configured to play an announcement to the calling communication station offering a messaging service if the call is unblocked, the end office switch being further configured to disconnect the call from the called communication station if the messaging service is selected and route the call to other network equipment to provide the messaging service,
a service switching point configured to receive the call routed from the non-AIN capable end office switch and to generate a query for further routing instructions;
a service control point (SCP) configured to receive the query for further routing instructions for the call, the SCP configured to return a response message if the call passes additional screening criteria, the response message indicating that the messaging service should be provided;
a platform configured as the network equipment to provide the messaging service to the calling communication station; and
wherein the SSP is configured to receive the response message from the SCP and connect the calling communication station with the platform to provide the messaging service.

2. The telecommunications system of claim 1 wherein the end office switch is further configured to route the call from the end office switch to the SSP using a directory number for the platform and wherein the SSP is configured to send a query message to the SCP upon encountering a specific digit string trigger assigned to the directory number for the platform.

3. The telecommunications system of claim 2 wherein the SSP is configured to send an Info_Analyzed query message to the SCP.

4. The telecommunications system of claim 1 wherein the SCP is further configured to communicate an Analyze_Route response message from the SCP to the SSP and wherein the SSP is configured to convey a setup message to a primary rate interface for the platform in response to the Analyze_Route response message, and wherein the platform is configured to interpret the setup message as a request for the messaging service.

5. The telecommunications system of claim 1 wherein the end office switch is configured to determine if a calling party associated with the calling communication station is a valid call type, determine if the called party and the calling party are within a common local access and transport area, determine if the called communication station is identified by a digit string that is blocked, or determine if the calling communication station has blocked calling line identification information.

6. The telecommunications system of claim 1 wherein the SCP is configured to determine if the calling communication station is on a termination blocking list for the messaging service, determine if presentation of calling line identification information for the calling communication station is blocked, determine if a geographical restriction applies to the call, or determining if there is a service origin restriction.

7. The telecommunications system of claim 1 wherein the non-AIN capable end office switch is configured to set an access to messaging timer upon ringing the called communication station and, upon expiration of the access to messaging timer, determine the blocking status.

8. The telecommunications system of claim 1 wherein the non-AIN capable end office switch is configured to detect a keypress at the called communication station after playing the announcement to the calling communication station and process the call in response to the detected keypress.

9. The method of claim 8 wherein the non-AIN capable end office switch is configured to continue to ring the called communication station while playing the announcement to the calling communication station and while detecting the keypress.

10. A telecommunications system capable of providing a messaging service for a call from a calling communication station to a called communication station, the telecommunications system comprising:
a non-Advanced Intelligent Network (AIN) capable end office switch associated with the called communication station, the non-AIN capable end office switch including
software for determining blocking status for the call if the call is not answered,
software for playing an announcement to the calling communication station offering the messaging service if the call is unblocked,
software for detecting a service selection input entered at the calling communication station; and
software to route the call to other network equipment in response to the service selection input;
a service switching point (SSP) including
software to receive and process the call when it has been routed to the other network equipment by the non-AIN capable end office switch;
software to generate a query for further routing instructions upon receipt of the call from the non-AIN capable end office switch; and
software to route the call in response to a message received in response to the query for further routing instructions;
a service control point (SCP) including
software for receiving the query for further routing instructions;
software for determining, in response to the query, if the call passes additional screening criteria, and
software for generating an Analyze_Route message directing the SSP to route the call to a service node for prompting and recording a message of the called communication station in response to passing the additional screening criteria.

11. The telecommunications system of claim 10 wherein the software for determining the blocking status for the call comprises at least one of:
software for verifying a valid call type;
software for verifying a common local access and transport area;
software for verifying a blocked digit string; and
software for verifying calling line identification information blocking.

12. The telecommunications system of claim 10 wherein the software for determining if the call passes the additional screening criteria comprises at least one of:
software for testing the calling communication station on a termination blocking list;
software for testing blocking of calling line identification information;
software for testing geographical restrictions for the call; and
software for testing a service origin restriction for the call.

* * * * *